(12) United States Patent
Ruehl et al.

(10) Patent No.: US 9,639,338 B2
(45) Date of Patent: May 2, 2017

(54) COMPUTER-IMPLEMENTED METHOD, SYSTEM AND COMPUTER PROGRAM PRODUCT FOR DEPLOYING AN APPLICATION ON A COMPUTING RESOURCE

(71) Applicant: DEUTSCHE TELEKOM AG, Bonn (DE)

(72) Inventors: Stefan Tobias Ruehl, Erzhausen (DE); Stephan Verclas, Plankstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/650,577

(22) PCT Filed: Nov. 8, 2013

(86) PCT No.: PCT/EP2013/073423
§ 371 (c)(1),
(2) Date: Jun. 9, 2015

(87) PCT Pub. No.: WO2014/090488
PCT Pub. Date: Jun. 19, 2014

(65) Prior Publication Data
US 2015/0309780 A1 Oct. 29, 2015

(30) Foreign Application Priority Data
Dec. 11, 2012 (EP) .................................... 12008253

(51) Int. Cl.
*G06F 9/445* (2006.01)
*H04L 29/08* (2006.01)

(52) U.S. Cl.
CPC ............ *G06F 8/60* (2013.01); *H04L 67/1095* (2013.01)

(58) Field of Classification Search
CPC .............................. G06F 8/60; H04L 67/1095
(Continued)

(56) References Cited

U.S. PATENT DOCUMENTS 5,675,746 A * 10/1997 Marshall ............. G06F 3/04815
705/35
8,261,295 B1 * 9/2012 Risbood .................... G06F 8/61
7/177
(Continued)

OTHER PUBLICATIONS

Stefan T Ruehl et al: "Toward Realization of Deployment Variability for Software-as-a-Service Applications", Cloud Computing (Cloud), 2012 IEEE 5th International Conference on, IEEE, Jun. 24, 2012 (Jun. 24, 2012), pp. 622-629, XP032215348.
(Continued)

*Primary Examiner* — Viva L Miller
(74) *Attorney, Agent, or Firm* — Leydig, Voit & Mayer, Ltd.

(57) ABSTRACT

A computer-implemented method for deploying an application on a computing resource includes: defining sets of groups of tenants for categorizing the plurality of tenants; assigning each tenant to at least one group of tenants; providing a deployment model for each combination of an application component of the plurality of application components and a tenant; determining constraint information for each combination of application component and tenant depending on the deployment model, wherein the deployment model is configured to enable each tenant to include and/or exclude entire groups of tenants from sharing one or more application components and/or infrastructure of the computing resource; determining a valid deployment configuration of the application depending on the constraint information associated with each application component; and deploying the application on the computing resource accordingly.

16 Claims, 5 Drawing Sheets

(58) Field of Classification Search
USPC .......................................................... 717/176
See application file for complete search history.

(56) References Cited

U.S. PATENT DOCUMENTS

| | | | |
|---|---|---|---|
| 9,037,922 B1* | 5/2015 | Cabrera | G06F 11/3072 714/47.1 |
| 2002/0197528 A1* | 12/2002 | Zunke | G06F 8/65 429/144 |
| 2005/0198031 A1* | 9/2005 | Pezaris | H04L 12/588 |
| 2007/0198973 A1* | 8/2007 | Choi | G06F 8/61 717/151 |
| 2008/0320109 A1* | 12/2008 | Andrews | G06F 8/65 709/220 |
| 2013/0046906 A1* | 2/2013 | Ripberger | G06F 3/0629 710/12 |
| 2013/0290941 A1* | 10/2013 | Kruglick | G06F 9/45516 717/148 |

OTHER PUBLICATIONS

William Arnold et al: "Automatic Realization of SOA Deployment Patterns in Distributed Environments", Service-Oriented Computing A ISOC 2008, Springer Berlin Heidelberg, Berlin, Heidelberg, vol. 5364, Dec. 1, 2008 (Dec. 1, 2008), pp. 162-179, XP019112313.

* cited by examiner

COMPUTER-IMPLEMENTED METHOD, SYSTEM AND COMPUTER PROGRAM PRODUCT FOR DEPLOYING AN APPLICATION ON A COMPUTING RESOURCE

CROSS-REFERENCE TO RELATED APPLICATIONS

This application is a U.S. National Phase application under 35 U.S.C. §371 of International Application No. PCT/EP2013/073423, filed on Nov. 8, 2013 and claims benefit to European Patent Application No. EP 12008253.2, filed on Dec. 11, 2012. The International Application was published in English on Jun. 19, 2014 as WO 2014/090488 under PCT Article 21(2).

FIELD

The present invention relates to a computer-implemented method, a system and a computer program product for deploying an application on a computing resource.

BACKGROUND

Software-as-a-Service (SaaS) is a delivery model whose basic idea is to provide applications to the customer on demand over the Internet. In contrast to similar but older approaches, SaaS promotes multi-tenancy as a tool to exploit economies of scale. This means that a single instance of an application serves multiple customers. The customers, who are also called tenants, are for example companies, clubs or private persons that signed up to use the application. Even though multiple customers use the same instance each of them has the impression that the instance is designated only to them. This is archived by isolating the tenants' data from each other. In contrast to single-tenancy, multi-tenancy hosts a plurality of tenants on the same instance.

However, one of the major drawbacks of multi-tenancy applications is the customers' hesitation of sharing infrastructure, application code, or data with other tenants. This is due to the fact that customers are afraid that other tenants might access their data due to a system error, malfunction, or destructive action. So far this problem has only been tackled by implementing and improving the isolation of tenants on a single instance.

SUMMARY

In an embodiment, the invention provides a computer-implemented method for deploying an application on a computing resource, wherein the application is provided remotely to a plurality of tenants of users, wherein the application comprises a plurality of application components, the computer-implemented method comprising: defining sets of groups of tenants for categorizing the plurality of tenants; assigning each tenant of the plurality of tenants to at least one group of tenants of the sets of groups of tenants; providing a deployment model for each combination of: an application component of the plurality of application components and a tenant of the plurality of tenants; determining constraint information for each combination of application component and tenant depending on the deployment model, wherein the deployment model is configured to enable each tenant of the plurality of tenants to include and/or exclude entire groups of tenants from sharing one or more application components and/or infrastructure of the computing resource; determining a valid deployment configuration of the application on the computing resource depending on the constraint information associated with each application component of the plurality of application components; and deploying the application on the computing resource depending on the determined valid deployment configuration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
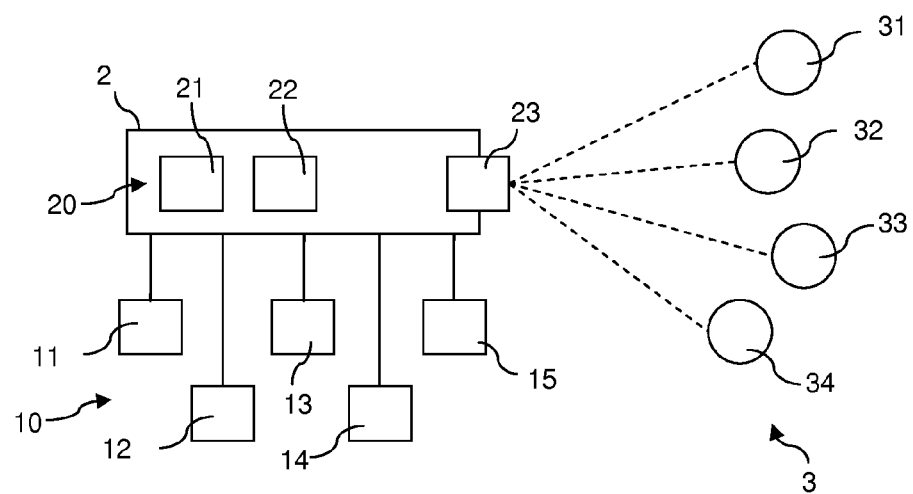
FIG. 1 schematically illustrates an embodiment of the system according to the present invention.

In an embodiment, the invention provides a technically simple, effective and cost effective solution for providing software services, wherein the information security of the application is high compared to industry standards, thereby optimizing the utilization efficiency of computing resources.

In an embodiment, the invention provides a computer-implemented method for deploying an application on a computing resource, wherein the application is provided remotely to a plurality of tenants of users, wherein the application comprises a plurality of application components, the computer-implemented method comprising:

defining sets of groups of tenants for categorizing the plurality of tenants, assigning each tenant of the plurality of tenants to at least one group of tenants of the sets of groups of tenants, providing a deployment model for each combination of
an application component of the plurality of application components and
a tenant of the plurality of tenants, determining constraint information for each combination of application component and tenant depending on the deployment model, wherein the deployment model is configured to enable each tenant of the plurality of tenants to include and/or exclude entire groups of tenants from sharing one or more application components and/or infrastructure of the computing resource, determining a valid deployment configuration of the application on the computing resource depending on the constraint information associated with each application component of the plurality of application components, deploying the application on the computing resource depending on the determined valid deployment configuration.

In an embodiment, the invention provides a computer-implemented method for deploying an application on a computing resource, wherein the application is provided remotely to a plurality of tenants of users, wherein the application comprises a plurality of application components, the computer-implemented method comprising:

defining sets of groups of tenants for categorizing the plurality of tenants, assigning each tenant of the plurality of tenants to at least one group of tenants of the sets of groups of tenants, for each application component of the plurality of application components, providing each tenant of the plurality of tenants with a deployment model associated with the application component, for each application component of the plurality of application components, receiving from each tenant of the plurality of tenants constraint information depending on the deployment model associated with the application component, determining a valid deployment configuration of the application on the computing resources depending on the constraint information associated with each application component of the plurality of application components, deploying the application on the computing resources depending on the determined valid deployment configuration.

It is thereby advantageously possible according to the present invention that by a hybrid solution between multi-tenancy and single-tenancy, which is also called mixed-tenancy, the operational cost of the application is decreased by sharing the computing resources among the plurality of tenants. The provider of the application is called herein as operator or service provider. In contrast to, for example, a framework for multi-tenant aware SaaS applications including data isolation, performance isolation or performance configuration the computer-implemented method of the present invention allows a tenant to give input for how and with whom their application components are deployed. Thereby a comparable high data security is achieved as tenants do not share the same application component instances. The mixed-tenancy deployment has the advantage that Infrastructure, in particular computing resources, are used more efficiently as compared to a single tenancy deployment, wherein efficient use of computing resources means that the computing resources necessary to run the application are minimized, for example the required size of memory and/or the number of processors. At the same time, better information security is achieved as compared to a multi-tenancy deployment. In particular, a multi-tenancy application is built based on the concept of Service-oriented Architecture, wherein so called composite SaaS-applications are composed of a plurality of application components that each offer atomic functionality. Alternatively, it is in particular also possible to provide a monolithic multi-tenancy application. In particular monolithic software system means that functionally distinguishable components are interwoven with rather than architecturally separate from the application. For example, the method according to the present invention comprises enabling the customer or tenant to choose if or with which other tenant of the plurality of tenants the tenant wants to share a specific application component. In this way, tenants may declare their requirements toward a deployment of their application variant. Based on the constraint information received from the tenant, it is advantageously possible to determine the most efficient deployment configuration for the application in a comparable fast way, thereby reducing required computing resources.

Moreover the method in particular comprises enabling each tenant of the plurality of tenants to include and/or exclude entire groups of tenants from sharing the same computing resources. In particular, the definition of sets of groups includes the creation of groups that represent particular industries, for example companies of information technology (IT) industry, telecommunication industry and/or pharmaceutical industry. The defined sets of groups may then be used to assign tenants according to the industries they operate in. The sets of groups, for example, are defined in such a way that the hierarchies of the industries are mapped onto the sets of groups. For example, banking and insurance are both part of the finance industry, whereby a tenant is enabled to exclude only the banking industry or the whole finance industry from sharing the same computing resource or application. In particular, the assignment of the tenants into groups allows the realization of the constraint requirements of the tenants with regard to the sharing of IT-infrastructure or computing resources with competitors, by excluding all industries he himself operates in. It is furthermore preferred to enable the tenant to explicitly include or exclude other tenants that are not yet tenants of the application, wherein the customer base is kept secret. In particular, a virtual tenant is a tenant that exists in real live but is not yet tenant of the application, wherein the method include replacing the virtual tenant by a company which becomes a tenant of the application after the application has been deployed. For example, the virtual tenant is transformed to a tenant by keeping all constraints valid, which have been specified by all other tenants previously. Thereby it is advantageously possible for the provider to avoid disclosing information about the identity of his costumers or tenants.

Preferably, a deployment model is a blueprint of a deployment constraint defining whether or how tenants are enabled to express their deployment constraints for their deployment or a particular application component and/or deployment level. For example, a deployment model is an interface for receiving constraint information associated with a specific combination of tenant, application component and/or a deployment level.

A deployment constraint—which is herein called constraint information—is a tenant's description of if or with which other tenant or tenants and/or groups infrastructure of the computing resource may be shared. It is necessary that a tenant gives a number of deployment constraints for the deployment of an entire application.

A deployment configuration is valid if it applies to all deployment constraints that were defined by all tenants.

Preferably, the deployment model is provided for each combination of application component, tenant and deployment level of a sequence of deployment levels, wherein in this case, constraint information are determined for each of such combination of application component, tenant and deployment level.

Preferably, the computing resource comprises one or more hardware and/or software resources for the deployment of the multi-tenancy application (infrastructure). In particular, in this context the different layers of the computing resource can also be understood as a stack of infrastructure or infrastructure stack of the computing resource.

Preferably, the constraint information is determined for each combination of application component, tenant and deployment level by using the deployment model. Preferably, the deployment model is configured to enable each tenant of the plurality of tenants to include and/or exclude entire groups of tenants from sharing one or more application components and/or deployment level (level of the infrastructure stack of the computing resource).

In particular, a deployment level (DL) is defined as a part of the infrastructure stack—also called a slice or level of the infrastructure stack—of the operator. Such a slice preferably encapsulates one or more layers of the infrastructure stack. According to the present invention, it is preferably possible for tenants to express not just constraints related to the sharing of application components but also for the underlying infrastructure. An example for such a sharing would be that a very security conscious tenant requires designated instances of application components but would be willing to share the underlying Virtual Machines and physical Servers with other Customers from a specific geographic region but not with competitors.

According to a preferred embodiment of the present invention determining constraint information for each combination of application component and tenant comprises:
 deriving the constraint information associated with the application component from a further constraint information associated with a further application component of the plurality of application components, the further application component being in a hierarchical relationship with the application component; or
 receiving the constraint information from the tenant of the plurality of tenants which is associated to the application component.

It is thereby advantageously possible to minimize the effort necessary to describe all deployment constraints. In particular, the tenants need only to define the constraint information of the further application component being in the hierarchical relationship with the application component. Preferably, the hierarchical relationship between the plurality of application components corresponds to directed graph without cycles. Preferably, the further application component is associated with a higher level than the application component, e.g. the further application component corresponds to a position closer to the top of the directed graph. It is preferred according to the present invention that the further constraint information is derived from the constraint information by inheritance in a top down direction within the hierarchy. It is thereby advantageously possible to guarantee that the higher level further application component (parent application component) is already associated with the further constraint information before deriving the constraint information associated with the lower level application component (child application component) from the further constraint information. Preferably, the constraint information is related to equal restrictive or more restrictive deployment constraints relative to the further constraint information.

According to a further preferred embodiment of the present invention, the valid deployment configuration is determined by means of an optimization method, wherein in a first step of the optimization method at least one initial deployment unit of a plurality of initial deployment units is generated per application component of the plurality of application components, the plurality of initial deployment units being associated with an initial deployment level of a sequence of deployment levels, wherein in a second step of the optimization method a plurality of further deployment units associated with a further deployment level is generated per further deployment level of the sequence of deployment levels, the plurality of further deployment units being generated depending on a plurality of preceding deployment units associated with a preceding deployment level in the sequence of deployment levels.

It is thereby advantageously possible to realize an optimized multi-tenancy application for both, the operator and the tenants. Preferably, for the operator the cost and effort are reduced, in particular with regard to the utilization of the infrastructure of the computing resource. Preferably, for the tenant the data security is improved at the same time. Once a deployment configuration has been created there will be one or more instances of every deployment level. These instances are referred to as deployment units (DU). The deployment configuration is optimal if it causes only minimal cost, by utilizing only a minimal number of units of the application component instances and the underlying infrastructure layers. Preferably, the second step is repeated for the whole sequence of deployment levels.

According to a further preferred embodiment of the present invention, the second step of the optimization method comprises determining a minimum number of further deployment units for deploying the plurality of preceding deployment units on the further deployment level depending on the constraint information.

It is thereby advantageously possible to realize an optimal multi-tenancy application in an efficient way by employing the optimization method. Preferably, the plurality of preceding deployment units is deployed on the further deployment level depending on all deployment constraints or constraint information associated with all combinations of application components and tenants related to the further deployment level or related to the further deployment level and to one or more of the preceding deployment levels.

According to a further preferred embodiment of the present invention the valid deployment configuration of the application is optimized by minimizing the total number of deployment units associated with all deployment levels.

It is thereby advantageously possible to provide an optimal deployment configuration within a relatively short period of time, wherein all constraints of the tenants are taken into account.

According to a preferred embodiment of the present invention, the computer-implemented method comprises:
 enabling each tenant of the plurality of tenants to include and/or exclude a module of an individual application component of the plurality of application components, wherein in particular the module is a cryptographic module for encryption and/or decryption of data associated with the application component.

Thereby, it is advantageously possible to allow tenants to choose between different technical implementations, for example by including and/or excluding different modules or technical solutions. A module is for example an instance of an application component or selectable feature of an application component. By providing the cryptographic module, it is advantageously possible to enable tenants or groups of tenants to safely access data, use application components and/or communicate with each other. In particular, with the cryptographic module it is possible to further increase the information security over unauthorized access. For example, by increasing the cryptographic strength, it is possible to increase an unauthorized person's demand of computing resources in such a way, that it is highly unlikely or even technically impossible to gain access to the tenants' information or data.

According to a further preferred embodiment of the present invention, the computer-implemented method comprises:
  enabling each tenant of the plurality of tenants to include and/or exclude the individual application component of the plurality of application components.

Thereby, it is advantageously possible to provide each tenant of the plurality of tenants with software applications being deployed in such a way as to fulfil each tenant's requirement individually.

According to a further preferred embodiment of the present invention, determining a valid deployment configuration includes generating a number of instances of each application component of the plurality of application components depending on the constraint information.

Thereby, it is advantageously possible to allow each tenant of the plurality of tenants to specify individually if and/or with which other tenant or groups of tenants an application component of the plurality of application components of the application is shared.

According to a further preferred embodiment of the present invention, the computing resource includes a plurality of computing machines in a computing environment, wherein deploying the application on the computing resources includes running at least one instance of the number of instances of each application component of the plurality of computing machines on at least one computing machine of the plurality of computing machines. Determining a valid deployment configuration includes assigning each instance of the number of instances of the at least one application component to exactly one computing machine of the plurality of computing machines depending on the constraint information.

Thereby, it is advantageously possible to distribute the application component instances in many different ways over different computing machines of the computing environment according to the determined deployment configuration. In particular, one specific deployment configuration out of a plurality of valid deployment configurations is selected for minimizing the required computing resources, for example number of processors and/or amount of memory. The computing machine is at least one of a physical computing machine or a virtual computing machine, whereby the computing environment is at least one of a physical computing environment or a virtual computing environment.

According to a further preferred embodiment of the present invention, determining a valid deployment configuration includes assigning each tenant to exactly one instance of the number of instances depending on the constraint information.

Thereby, it is advantageously possible to assign each tenant individually to that instance of the number of instances of an application component which fulfils the constraints that the tenant has specified for that application component. The number of instances is in particular assigned to one specific application component, wherein a further application component has a further number of instances.

According to a preferred embodiment of the present invention, providing a deployment model for each combination of tenant and application component includes:
  providing the tenant with a set of deployment models,
  enabling the tenant to assign exactly one deployment model of the set of deployment models to each application component of the plurality of application components; and,
  enabling the tenant, for each application component of the plurality of application components, to determine constraint information for the assigned deployment model.

According to an alternative embodiment of the present invention, providing each tenant of the plurality of tenants, for each application component of the plurality of application components, with a deployment model associated with the application component includes:
  enabling the tenant to assign exactly one deployment model to each application component of the plurality of application components; and,
  enabling the tenant, for each application component of the plurality of application components, to determine constraint information for the assigned deployment model.

Thereby, it is advantageously possible to enable each tenant of the plurality of tenants to individually describe the constraints to each application component of the plurality of application components of the application. In particular, with the deployment model the tenant is enabled to include and/or exclude other tenants, groups of tenants and/or users of a tenant from using a specific application component. The users of tenants are included or excluded, for example, implicitly by including or excluding a tenant or through the tenant. For example, the tenant selects for each application component exactly one deployment model in which the tenant wants the application instance of the application component to run in. It is thereby preferred, that the tenant makes two such selections, in order to define a deployment model for two levels of deployment, wherein the two levels of deployment include an instance level and an computing machine level, in particular a virtual machine level. The deployment model may be applied to multiple or all application components, wherein the tenant is enabled to specify that the entire application is shared with other tenants except for one or more specific application components that process very sensitive data. The application component that processes very sensitive data is preferably deployed in another of the following deployment models. The number of deployment levels is not limited to the two deployment levels as described above. For example, according to another preferred embodiment of the present invention the number of deployment levels is selected by the service provider or operator of the computing resources. Thereby it is advantageously possible, for example, to restrict the services provided to tenants, for example to provide only one deployment level, specifically the virtual machine level.

According to a preferred embodiment of the present invention, assigning exactly one deployment model of the plurality of deployment models to each application component of the plurality of application components includes assigning one of a private deployment model, a public deployment model, a black deployment model, a white deployment model and/or a gray deployment model, wherein the private deployment model is configured to disable the sharing of the application component with all other tenants, wherein the public deployment model is configured to enable the sharing of the application component with all other tenants, wherein the black deployment model is configured to disable the sharing of the application component with all other tenants of a blacklist specified by the tenant, wherein the white deployment model is configured to enable the sharing of the application component with all other tenants of a whitelist specified by the tenant, wherein the gray deployment model is configured to enable or disable the sharing of the application component with another tenant as specified by the tenant.

Thereby, it is advantageously possible to enable each tenant of the plurality of tenants to individually describe the constraints to each application component of the plurality of application components of the application. For example, the requirements of the tenants or customers are modeled based on the so called Web Ontology Language (-OWL)-model and the Resource Description Framework (RDF) or alternatively based on other concepts of ontology in information science that allow customers to choose between five different deployment models. Each deployment model enables the tenant to specify with which other tenant or group of tenants the tenant wishes to be deployed and/or in which way the tenant wants to be deployed. In particular, the deployment includes the exclusion or inclusion of another tenant or groups of other tenants. Each group of tenants might encapsulate a number of other groups. In particular, grouping is used as a generic way of describing the requirements of tenants, for example on information security, wherein different customer requirements might be realized based on the grouping. The deployment model enables each tenant or customer to explicitly specify with which other tenant or group of tenants the tenant wishes or doesn't wish to share application components and/or computing resources, for example a physical computing machine, a virtual computing machine.

According to a preferred embodiment of the present invention, determining the valid deployment configuration includes, for each tenant of the plurality of tenants, specifying the required resources for each application component of the plurality of application components, wherein the required resources include in particular size of memory and/or number of processors. Moreover, determining the valid deployment configuration includes specifying available computing resources for running the application, wherein the available computing resources include in particular size of memory and/or number of processors. The valid deployment configuration is determined depending on the required resources and depending on the available resources by minimizing the required resources depending on the constraint information.

Thereby, it is advantageously possible to optimize the required resources for the deployment of the application on the computing resources, thereby reducing the operational cost of the application by sharing the computing resources among the plurality of tenants. Moreover, each tenant is individually enabled to give input for how and with whom the application components of the tenants are deployed. Thereby a comparable high data security is archived as tenants do not share the same application component instances. With the present invention the further advantage is achieved that infrastructure, in particular computing resources, may be used more efficiently with regard to a single tenancy deployment, whereby a much better information security is achieved as compared to a multi-tenancy deployment.

In an embodiment, the invention provides a system for deploying an application on a computing resource, wherein the application is offered remotely to a plurality of tenants of users, wherein the application comprises a plurality of application components, the system comprising:

at least one programmable processor integrated with the computing resource; and
a machine-readable medium integrated with the computing resource storing instructions that, when executed by at least one programmable processor cause the at least one programmable processor to perform the operations of the computer-implemented methods described above.

In an embodiment, the invention provides a computer program product for deploying an application on a computing resource, wherein the application is offered remotely to a plurality of tenants of users, wherein the application comprises a plurality of application components, comprising a non-transitory storage medium readable by at least one processor and storing instructions for execution by at least one processor for performing the operations of the computer-implemented methods described above.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1 an embodiment of the system according to the present invention is illustrated schematically. The system is programmed to interact with a plurality of tenants 3, in particular a first tenant 31, a second tenant 32, a third tenant 33 and a fourth tenant 34 via a dispatcher 23, wherein the dispatcher is configured to direct a user of a tenant 31, 32, 33, 34 onto an instance of one of the application components 11,12, 13, 14, 15 the tenant has been assigned to, in particular by employing a server, for example a domain name server (DNS). The system comprises a plurality of computing machines 20 integrated with a computing resource 2 of the system, wherein the computing resource is for example a physical computing environment or a virtual computing environment. In particular, a first computing machine 21 and a second computing machine 22 of the plurality of computing machines 20 is for example a physical computing machine or a virtual computing machine, wherein the virtual computing machine is a simulation of a physical computing machine. The application 1 comprises a plurality of application components 10, wherein for example the plurality of application components 10 includes a first application component 11, a second application component 12, a third application component 13, a fourth application component 14 and a fifth application component 15. For example, the determination of a deployment configuration for the deployment of the application 1 on the computing resource 2 includes one of the following constraints, which is specified by each tenant 31, 32, 33, 34 of the plurality of tenants 30. First, none of the first application component 11, the second application 12 component, the third application component 13 or the fourth application component 14 is handling any critical data thus each tenant 31, 32, 33, 34 of the plurality of tenants 30 specifies to share an instance 110, . . . , 142 (see FIG. 2) of one of said first to fourth application component 31, 32, 33, 34. Second, the fifth application component 15 handles very sensitive data. For example, the first tenant 31 and the second tenant 32 each specify to have their own designated instance of the fifth application component 15. The third tenant 33 specifies that he does not want to share an instance (not shown) of the fifth application component 15 with competitors. The fourth tenant 34 wishes to share an instance of the fifth application component 15 only with those tenants located in Europe. Third, the fifth tenant 35 specifies that none of the plurality of application components 10 may be shared with any other tenant 31, 32, 33, 34 of the plurality of tenants 3. Thus the fifth tenant 35 uses a single-tenancy application. Thereby, for example, the fifth tenant 35 is assigned to the second computing machine 22 of the plurality of computing machines 20, where no other tenant 31, 32, 33, 34 of the plurality of tenants 3 is assigned to.

Figure 2:
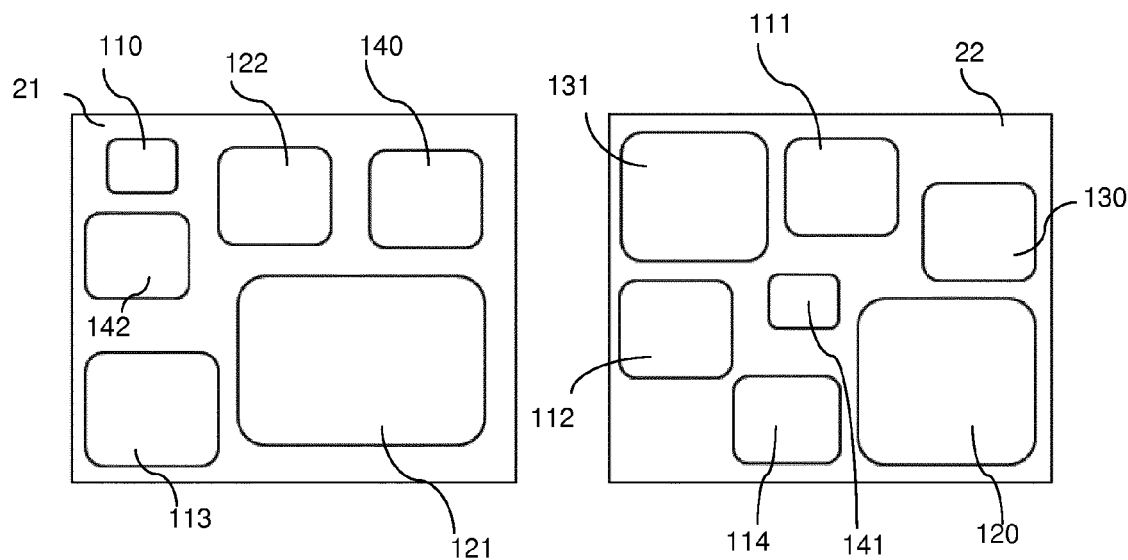
FIG. 2 schematically shows a diagram of the distribution of instances of the plurality of application components on the plurality of computing machines.

In FIG. 2, a diagram of the distribution of instances 110, . . . , 142 of the plurality of application components 10 on the plurality of computing machines 20 is shown schematically. A number of instances 110, . . . , 142 of a plurality of application components 10, for example first instances 110, 111, 112, 113, 114 of a first application component 11, second instances 120, 121, 122 of a second application component 12, third instances 130, 131 of a third application component 13 and fourth instances 140, 141, 142 of a fourth application component 14, are deployed on a plurality of computing machines 20, for example a first computing machine 21 and a second computing machine 22 depending on constraint information specified by a plurality of tenants 3. Said number of instances 110, . . . , 142 are distributed on the plurality of computing machines 20 according to a deployment configuration, the deployment configuration being determined depending on constraint information received from a tenant 31, 32, . . . , 35 of the plurality of tenants 3. Depending on the constraint information the number of instances 110, . . . , 142 of the plurality of application components 10 is generated by the application 1. For example, for the first application component 11 five first instances 110, 111, 112, 113, 114 are generated. Each tenant is enabled to use only one instance per application component of the plurality of application components 10.

Figure 3:
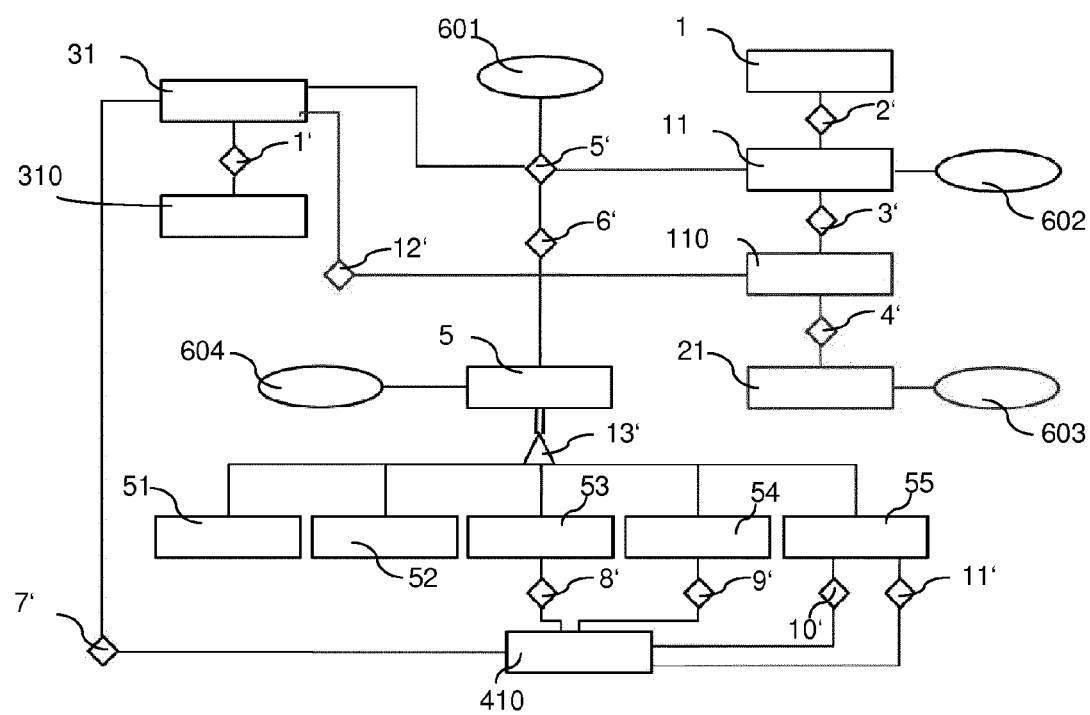
FIG. 3 shows an entity-relationship diagram illustrating the computer-implemented method of the present invention.

In FIG. 3, an entity-relationship diagram is shown for illustration of the computer-implemented method of the present invention. The entity-relationship diagram is described as an example for the following entities: a tenant 31 of the plurality of tenants 3, a user 310 of a plurality of users of the tenant 31, a group 410 of a set of group 41 of sets of groups 4, an application 1, an application component 11 of the plurality of application components 10, an application instance of a number of application instances 110, . . . , 115, wherein the number of application instances 110, . . . , 115 is determined depending on the constraint information specified by all tenants 31, 32, . . . , 35 of the plurality of tenants 3. The description of FIG. 3 also applies to a plurality of said entities correspondingly.

In contrast to a single-tenancy application a multi-tenancy application is, for example, used by a plurality of tenants 3 at the same time. A tenant 31 is for example a specific company that signed up to use the application 1. A tenant 31 of the plurality of tenants 3 has at least one user 310 that uses the application 1, wherein for example a user 310 represents an employee of said company and wherein each user 310 belongs to one specific company. This relation between a user 310 and a company is shown in FIG. 3 by the entities tenant 31 and user 310 as well as the first relationship 1', which means that the user 310 belongs to the tenant 31. The application 1 is composed of a plurality of application components 10, where an application component 11 is shown in FIG. 3. In particular, such an application 1 is also called a composite SaaS application 1. In order to meet the individual requirements of the tenant 31 with regard to information security and performance requirement 601, the tenant 31 requires, as indicated by the fifth relationship with reference number 5', an application component 11 from the application 1, wherein the application 1 consists at least of the application component 11, as indicated by reference number 2'. However, not every application component 11 of the plurality of application components 10 is used by every tenant 31, 32, . . . , 35 of the plurality of tenants 3, because each tenant 31, 32, . . . , 35 has different functional requirements towards the application 1. In FIG. 3 the entities tenant 31, application component 11, application 1, as well as the second relationship 2', which means that the application 1 consists of an application component 11, and the fifth relationship 5', which means the tenant 31 requires am application component 11, indicate such a functional requirement. Furthermore, the tenant 31 has to specify how much of the computing machine 21 of the computing resource 2 the tenant 31 needs to use a particular application component 11, which is indicated by the property required performance 601 together with the fifth relationship 5' in FIG. 3. An application component 11 is a representation of a piece of atomic functionality that is not yet executable by the computing machine 21. In order to enable the tenant 31 to use the application component 11, the application component 11 needs to be deployed. This means, for example, that an instance 110 of the application component 11 is generated by the application 1 on the computing machine 21, wherein the instance 110 of the application component 11 runs in the computing machine 21 of the computing resource 2. In particular, a deployment of an application component 11 is called an instance 110 of the application component 11. Accordingly, for an application component 11, a number of instances 110, . . . , 114 (see FIG. 2) of an application component 11 are generated depending on constraint information specified by each tenant 31, 32, . . . , 35 of the plurality of tenants 3, wherein a instance 110 of the number of instances 110, . . . , 114 is deployed by a particular computing machine 21 of the plurality of computing machines 20. For example, a computing machine 21 is a virtual computing machine or a physical computing machine. The plurality of computing machines 20 is deployed in a so called cloud infrastructure (IaaS), wherein each computing machine 21 is configured to host one or more instances 110, . . . , 114 of an application component 11 of the plurality of application components 10 depending on the determined deployment configuration. Each computing machine 21 of the plurality of computing machines 20 has a property that is called offered resource 603, wherein the property offered resource 603 expresses how much of the computing resource 2 a computing machine 21 can provide to provision the number of instances 110, . . . , 114 of an application component 11 of the plurality of application components 10. The unit in which the offered resource 603 is measured is preferably the same as the aforementioned resource associated with the performance requirement 601 according to the fifth relationship 5'. For example, measures of resource associated with performance requirement 601 or the offered resource 603 are the size of memory and/or the number of processors of a computing resource 2. In FIG. 3, the offered resource 603 of the computing machine 21 is provided to execute, represented by a fourth relationship 4', an application instance 110 being offered by, represented by a third relationship with reference number 3', by the application component 11.

The tenant 31 is assigned to an instance 110 of the number of instances 110, . . . , 114 of an application component 11 of the plurality of application components 10 based a deployment model 5 the tenant 31 has, which is illustrated with a sixth relationship 6'. In particular the deployment model 5 includes one of a private deployment model 51, a public deployment model 52, a white deployment model 53, a black deployment model 54 or a gray deployment model 55.

According to the private deployment model 51 the instance of an application component 11 is deployed, see for example the thirteenth relationship 13', specifically for a single tenant 31. This instance 11 is not shared with other tenants 32, . . . , 33, thus the deployed application component 11 does not need to support multi-tenancy. At this point the entire application 1 stops being a pure multi-tenancy application. For example, it is also possible that a tenant 31 demands that all application components 11 are deployed following the private deployment model 51.

According to the public deployment model 52 all tenants 31, . . . , 35 of the plurality of tenants 3 are enabled to share an instance 110. A tenant 31, . . . , 35 of the plurality of tenants 3 has no influence on with whom the tenant 31 is deployed. As this is the easiest way for an operator or service provider of the computing resource to deploy the application 1 on the computing resource 2, it is usually also the cheapest solution for a tenant 31. Thereby it is advantageously possible to share cost of operation.

The white deployment model 53 enables a tenant 31 to specify which other tenant 32, 33, . . . , 35 a tenant 31 shall share an instance 110 of the application component 11. For example, a company demands that individual departments share an instance 110, but any external tenant 32, 33, . . . , 35 is not allowed to use the same instance 110. Furthermore, the white deployment model 53 enables the management of collaborations between a user 310 and other users (not shown), other tenants 32, 33, . . . , 35 or another group 411, . . . , 412 of a set of groups 41, 42, . . . , 43 of tenants. The white deployment model 52 can be used to enable a tenant 31 to specify to share an application instance 110 that allows for collaboration. In FIG. 3 the relationship 7' illustrates that the tenant 31 belongs to a group 410. A tenant 31 is enabled to specify constraint information associated with the white deployment model 53, see eighth relationship 8', which means that a tenant 31 is deployed with a group 410 of other tenants as specified by a tenant 31 in the constraint information for an application component 11.

According to the black deployment model 54 a tenant 31 is enabled to specify with which other tenant 32, 33, . . . , 35 a tenant 31 does not want to be deployed. For example, this is done by excluding a group 410 of tenants, which is illustrated by a ninth relationship 9'. A group 410 for example represents all tenants 31, 32, . . . , 35 of a specific legal area, country, industry or a specific industry. A constraint specified by a tenant 31 that can be fulfilled using the black deployment model 54 is that a tenant 31 demands not to be deployed with competitors, without specifically specifying who they are. In FIG. 3 this is indicated by the ninth relationship 9' or tenth relationship 10' as the said ninth relationship 9' and tenth relationship 10' both express with which group 410 a tenant 31 wishes not to be deployed for an application component 11, in particular which group 410 is excluded.

The gray deployment model 55 enables a tenant 31 to stat with whom a tenant 31 wishes to share an instance 110 of an application component 11 and with whom a tenant 31 doesn't wish to share an instance 110 of the application component 11. This may be done by explicitly excluding and including a group 410. For example a tenant 31 does not wish to be deployed with competitors and additionally a tenant 31 wishes only to be deployed with customers that follow the European Data Privacy Act.

In order to enable the service provider to save on cost of operation and to satisfy such a demand the optimal deployment is determined based on the constraint information received from the plurality of tenants 3 and the offered resource 603. For example according to the diagram of FIG. 3, an optimal deployment is determined depending on the instance 110 of the application component 11, the computing machine 21 and a twelfth relationship 12' and the fourth relationship 4', wherein the twelfth relationship 12' indicates that a tenant 31 uses an application instance 110 and the fourth relationship 4' indicates that an application instance 110 is executed on a computing machine 21.

Figure 4:
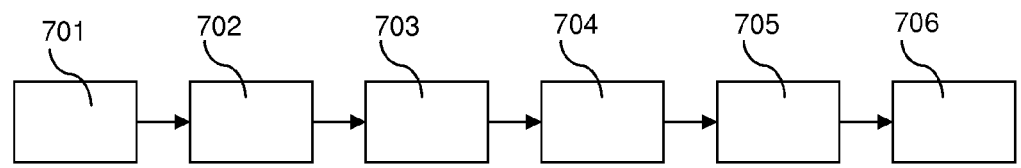
FIG. 4 shows a flow diagram illustrating the computer-implemented method of the present invention.

In FIG. 4, a flow diagram illustrating the deployment according to the computer-implemented method of the present invention is shown.

In a first step 701 the deployment model 5 (see FIG. 3) is determined, which enables each tenant 31, 32, . . . , 35 (see FIG. 5) individually to describe the constraints on the application 1. The constraint includes for example the specification with which other tenant 32, 33, . . . , 35 or group 410, . . . , 412 of tenants a tenant 31, 32, . . . , 35 accepts the sharing of the same instance 110, . . . , 142 (see FIG. 2) of an application component 11, 12, . . . , 16 (see FIG. 5) or the sharing of the same computing machine 21, 22 (see FIG. 1).

In a second step 702 sets of groups 4 (see FIG. 5) are defined by the computing resource 2, e.g. of a service provider. The sets of groups 4 are for example defined according to industries the tenants 31, 32, . . . , 35 operate in. Such an industry based definition of groups 410, . . . , 412 and assignment of tenants 31, 32, . . . , 35 into the defined groups 410, . . . , 412 is only one possible way of grouping tenants 31, 32, . . . , 35, wherein said grouping depends on for example on the target market. The second step 702 allows service providers or operators to define how many and which sets of groups 4 they desire to offer to the tenants 31, 32, . . . , 35. For example, a group 410, 411, . . . , 412 of a set 41 of the sets of groups 4 has sub-groups 4100, 4101, . . . , 4102 that are a sub-set of the set 41 of groups 410, 411, . . . , 412. The capability of structuring sets of groups 4 in this way enables the service provider to categorize or assign a tenant 31, 32, . . . , 35 into a group 410, 411, . . . , 412 or sub-group 4100, 4101, . . . , 4102 in a much finer-grained way. In another example, a tenant 31, 32, . . . , 35 is part of a certain sub-industry that belongs to a particular industry, in particular banking industry or insurance industry both being part of the finance industry. However, once a tenant 31, 32, . . . , 35 specifies to include or exclude a particular group 410 then all sub-groups 4100, 4101, ..., 4102 of this particular group 410 are also included or excluded, respectively.

In the third step 703 a tenant 31, 32, ..., 35 is grouped into at least one group 410 of the set of groups 4 by the service provider, wherein in particular all tenants 31, 32, ..., 35 are grouped that wish to use the application 1. A tenant 31, 32, ..., 35 is thereby assigned to at least one group per set of groups 41, 42, ..., 43. This means that every tenant 31, 32, ..., 35 must belong to at least one group of the sets of groups 4 that realize a particular set of group 41, 42, ..., 43.

In the fourth step 704 the constraints are defined according to which the deployment configuration of the application 1 is determined. The deployment configuration is determined based on the constraint information specified by the plurality of tenants 3 for two deployment levels 1000, 2000. In particular, the two deployment levels 1000, 2000 include an instance level 1000 and a computing machine level 2000. On the instance level 1000 each tenant 31, 32, ..., 35 of the plurality of tenants 3 specifies for each application component 11, 12, ..., 16 of the plurality of application components 10 with which other tenant 31, 32, ..., 35 or group 410, 411, ..., 412 of a set 41, 42, ..., 43 of the sets of groups 4 the tenant 31, 32, ..., 35 accepts the sharing of an instance 110, ..., 142 of the application component 11, 12, ..., 16 or if the tenant 31, 32, ..., 35 wants to share the instance 110, ..., 142 with another tenant 31, 32, ..., 35 at all. After all tenants 31, 32, ..., 35 of the plurality of tenants 3 have specified their constraints, the number of instances 110, ..., 142 of each application component 11, 12, ..., 16 of the plurality of application components 10 and/or the deployment configuration for the application 1 is determined depending on the constraint information received from each tenant 31, 32, ..., 35 of the plurality of tenants 3. On the computing machine level 2000, for example a virtual machine level 2000, each tenant 31, 32, ..., 35 of the plurality of tenants 3 specifies with which other tenant 31, 32, ..., 35 the instance they use may share a computing machine 21, 22 of the plurality of computing machines 20. This means, for example, that two instances 110, ..., 142, in particular regardless of which application component the instances 110, ..., 142 belong to, is only deployed on the same computing machine 21, 22 of the plurality of computing machines 20, if all tenants 31, 32, ..., 35 using these instances have specified that sharing the same computing machine 21, 22 is acceptable. Thus, it is in particular preferred according to the method of the present invention that each tenant 31, 32, ..., 35 is enabled to express constraints regarding the deployment of the application 1 twice per application component 11, 12, ..., 16, once for each level of the two levels 1000, 2000.

In the fifth step 705, the constraint information is used to determine a valid deployment configuration, wherein the constraint information is received from each tenant 31, 32, ..., 35 of the plurality of tenants 3 for each application component 11, 12, ..., 16 of the plurality of application components 10 in the fourth step 704. In particular, the valid deployment configuration is determined depending on the specification of each tenant 31, 32, ..., 35 for each application component 11, 12, ..., 16 of each of the two levels 1000, 2000, whether to share computing resource 2 or not.

In the sixth step 706, the application 1 is deployed on the computing resource 2 depending on the deployment configuration specified in the fifth step 705. The deployment of the application 1 on the computing resource 2 means, for example, that the application 1 is configured and installed on the computing resource 2. Moreover, the deployment of the application 1 on the computing resource 2 includes preferably the distribution of the instances 110, ..., 142, ... of the application components 11, 12, ..., 16 on the plurality of computing machines 20, in particular virtual computing machines, depending on the constraint information received from all tenants 31, 32, ..., 35 of the plurality of tenants 3.

According to the following example, the deployment method of an application 1 on the computing resource 2 is implemented using the Web Ontology Language (OWL) (not shown). According to the so called OWL-model, the classes AC, Tenant, Group, and Dimension are created, wherein in particular the class Dimension refers to sets of groups. In addition there is a property called isRealizedBy between Dimension and Group, which is used to associate groups to the dimensions they implement. Another class called Deployment is created. The class Deployment is the domain of a first property called of and a second property called for. The two properties of and for serve to determine which tenant specifies the deployment and which application component the deployment shall apply to. Furthermore, Deployment has five sub-classes, in particular Private, Public, White, Black, and Gray. Each sub-class represents a particular deployment model. The sub-class Gray expresses, for example, that once an object of Gray is created it is also of type Deployment.

In order to capture all requirements two data properties are included in the model. A first data model, which is also called isCustomer, is of the Domain Tenant. If the first data model is set to false the creation of virtual tenants is allowed. A second data model, which is also called onLevel, is of the Domain Deployment. The second data model allows specifying if a deployment applies to the Instance level or the computing machine level. Preferably, the deployment configuration is displayed as a plurality of directed graphs without cycles to the operator or service provider of the computing resource. This is realized by creating a super-class for Tenant and Group called Entity. It is defined that any time when a group is excluded, then all groups that are sub-set to this group are excluded as well. The same applies to the Inclusions property. Both properties are defined transitive, thus they will include and exclude down to the end of a tree representing the structure of a set of groups. Furthermore, two property ranges are defined as Entity. The Domain of a first property range, also called Included, is defined as either Group or GrayHybrid or WhiteHybrid. A second property range, also called Excludes, is defined as either Group or GrayHybrid or BlackHybrid. The first and the second properties are super-property to a third property range, the third property range being also called hasSubSet. Using the third property range it is possible to create a structure of set of groups and the assignment of tenants to groups is enabled.

In particular, the exclusion or inclusion of all groups according to the structure defined by the service provider is enabled.

Figure 5:
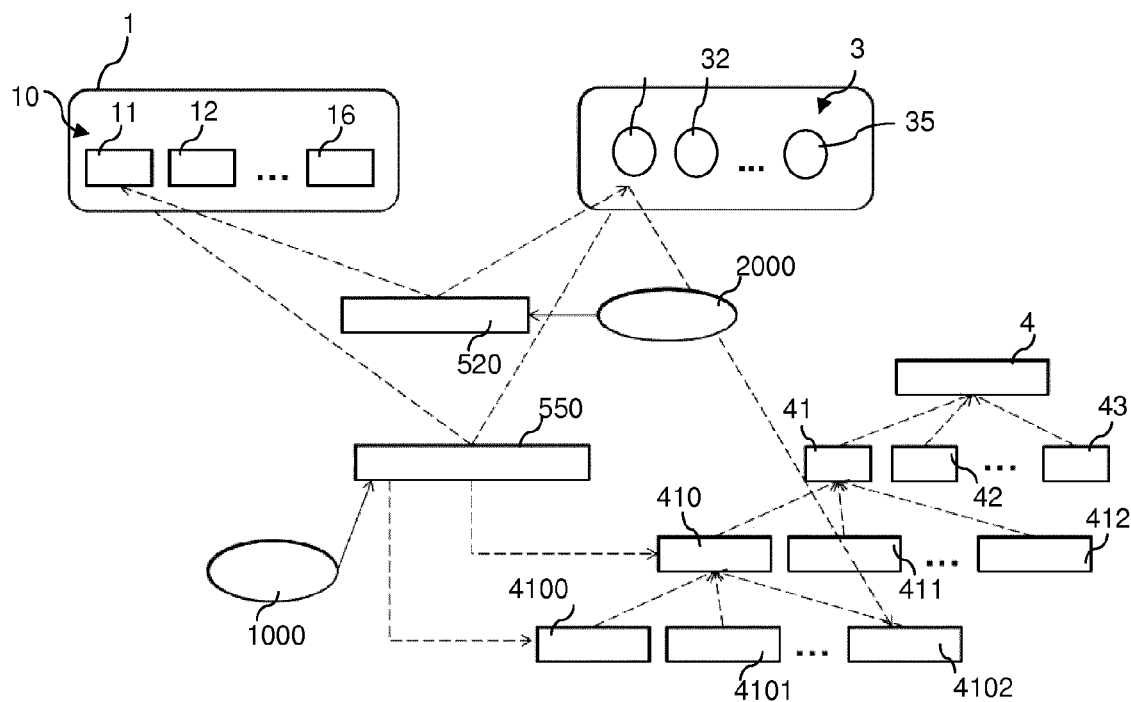
FIG. 5 schematically in a diagram illustrates the deployment of an application instance according to the computer-implemented method of the present invention.

In FIG. 5 a diagram illustrates the deployment of an instance (not shown in FIG. 5) of an application component 11 according to the computer-implemented method of the present invention. After the sets of groups 4 have been defined by the service provider and each tenant 31, 32, ..., 35 of the plurality of tenants 3 has been assigned to at least one group 410, 411, ..., 412 or, for example to a subgroup 4100, 4101, ..., 4102 of a group 410, of a set 41, 42, ..., 43 of sets of groups 4 the service provider receives constraint information from each tenant 31, 32, . . . , 35 of the plurality of tenants 3 for each application component 11, 12, . . . , 16 of the plurality of application components 10 depending on a deployment model 5. In particular, one of five deployment models 51, 52, 53, 53, 55 is assigned to each application component 11, 12, . . . , 16 of the plurality of application components 10 by a tenant 31, 32, . . . , 25. The constraint information includes, for example, the information whether a tenant 31, 32, . . . , 35 accepts to share an application component and/or with which other tenant a tenant denies to share an application component 11, 12, . . . , 15, wherein such a constraint is particularly specified for every application component 11, 12, . . . , 15 twice, more specifically, once per a deployment level 1000, 2000. A deployment level 1000, 2000 is in particular one of a computing machine level 2000 or an instance level 10000. For the specification of constraint information associated with the computing machine level 2000 a tenant 31, 32, . . . , 35 specifies whether and with which other tenant 31, 32, . . . , 35 a sharing of the same computing machine 21, 22, . . . is accepted or denied. A computing machine 21, 22, . . . is particularly one of a virtual computing machine or a physical computing machine. For the specification of constraint information associated with the instance level 10000 a tenant 31, 32, . . . , 35 specifies whether and with which other tenant 31, 32, . . . , 35 a sharing of the same instance 110, . . . , 142, . . . of an application component 11, 12, . . . , 16 is accepted or denied on the same computing machine 21, 22, . . . .

A tenant 31, 32, . . . , 35 is assigned to a group 410, 411, . . . , 412 of a set 41, 42, . . . , 43 of sets of groups 4 or, for example to a subgroup 4100, 4101, . . . , 4102 of a group 410. The tenant 31, 32, . . . , 35 assigns the public deployment model 51 to an application component 11, 12, . . . , 16 on the computing machine level 2000, which means that the computing machine 21, 22, . . . may be shared with all other tenants 31, 32, . . . , 35. This assignment of a public deployment model 52, also called public deployment, is illustrated in FIG. 5 by reference number 520. On the instance level 1000 the tenant 31, 32, . . . , 35 assigns the gray deployment model 55 to an application component 11. This assignment of a gray deployment model 55, also called gray deployment, is illustrated in FIG. 5 by reference number 550. The tenant 31, 32, . . . , 35 specifies in the constraint information for the gray deployment model 55 that tenants 31, 32, . . . , 35, who are assigned to a group 410 or a first sub-group 4100 of a group 410, are included, whereas tenants who are assigned to another subgroup 4101, . . . , 4102 are excluded.

Figure 6:
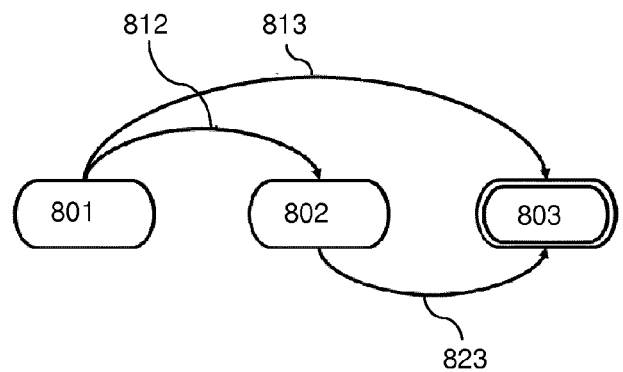
FIG. 6 schematically illustrates states of a deployment model.

FIG. 6 schematically illustrates states of a deployment model 51, 52, 53, 54, 55 of the set of deployment models 5. Determining the constraint information depending on the deployment model 51, 52, 53, 54, 55 comprises determining one constraint information per combination of tenant 31, 32, . . . , 35, application component 11, 12, . . . , 16 and deployment level 1000, 2000. Preferably, a state machine is used to define states of the deployment model 51, 52, 53, 54, 55. Here, the states being one of empty (reference numeral 801), incomplete (reference numeral 802) or completed (reference numeral 803). The states represent points in time, where the deployment model 51, 52, 53, 54, 55 is used to capture tenant's 31, 32, . . . , 35 deployment constraints (constraint information). The initial state is called empty state 801, wherein in the empty state 801 no description of the deployment constraints is associated with the deployment model 51, 52, 53, 54, 55.

By completing the description (see reference numeral 813) the deployment model 51, 52, 53, 54, 55 is transformed into the completed state 803 depending on constraint information received from the tenant 31, 32, . . . , 35. Alternatively, the deployment model 51, 52, 53, 54, 55 may be transferred into the completed state 803 via steps 812 and 823 by using the hierarchical relationship of the plurality of application components 10 such that the effort for describing all deployment constraints is minimized. For example, the tenant may only provide an incomplete description (see reference numeral 812) or no description (not shown) such that the description may be completed in a subsequent completion process 823.

According to a preferred embodiment of the present invention the constraint information associated with the application component 11, 12, . . . , 16 is determined in the completion process, wherein the completion process includes deriving the constraint information associated with the application component 11, 12, . . . , 16 from a further constraint information associated with a further application component 11, 12, . . . , 16 of the plurality of application components 10, the further application component being in a hierarchical relationship with the application component 11, 12, . . . , 16.

Preferably, the completion process comprises the following completion steps:

A first completion step comprises determining whether the deployment model 51, 52, 53, 54, 55 or description of the deployment model 51, 52, 53, 54, 55 is complete. In particular, for each combination of tenant 31, 32, . . . , 35, application component 11, 12, . . . , 16 and deployment level 1000, 2000 it is determined whether associated constraint information exist. If such constraint information exist, it is determined whether the same deployment constraints exist for the same combination of tenant 31, 32, . . . , 35, deployment level 1000, 2000 and child application component 11, 12, . . . , 16. If this is not the case, the completion process determines that the deployment model 51, 52, 53, 54, 55 of the child application component 11, 12, . . . , 16 is incomplete and continues with a second completion step.

In the second completion step, the hierarchical relationship between the plurality of application components 10 is utilized to completely describe all deployment constraints (i.e. transfer all deployment models 5 associated with this combination into the completed state 803). Preferably, this is achieved by inheritance of the constraint information from a parent application component to a child application component (equipping an application component with deployment constraints based on inheritance). Preferably, only those application components 11, 12, . . . , 16 without assigned constraint information to their associated deployment model 51, 52, 53, 54, 55 obtain a constraint information based on inheritance. Preferably, the creating of new constraint information based on inheritance includes the application of a set of rules in such a way that the inherited constraint information of the child application component 11, 12, . . . , 16 are equal or more restrictive relative to the constraint information of the parent application component 11, 12, . . . , 16.

Figure 7:
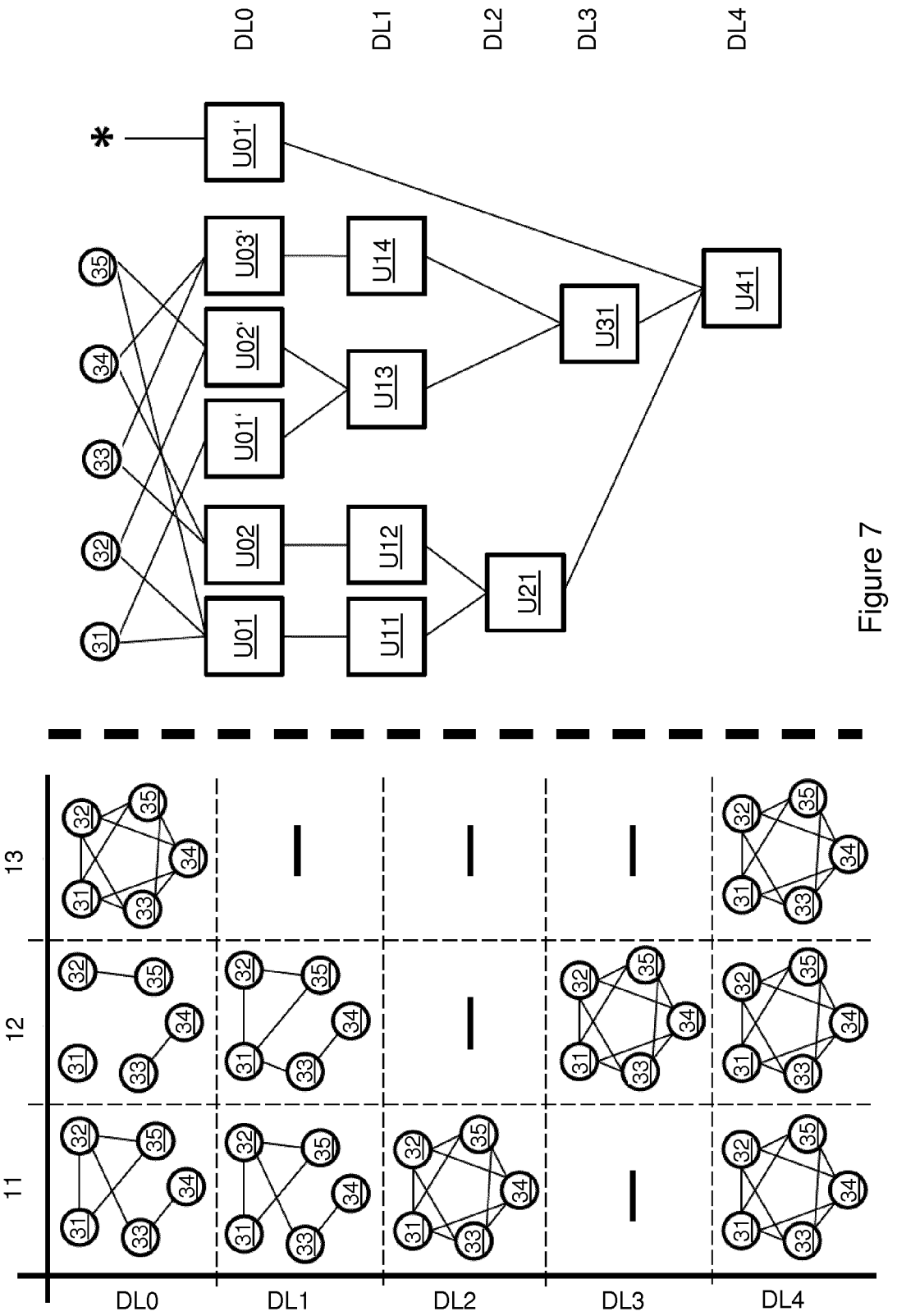
FIG. 7 schematically illustrates a valid deployment configuration.

FIG. 7 schematically illustrates a valid deployment configuration. A deployment configuration is valid if the deployment configuration complies with all deployment constraints given by the tenants 31, 32, . . . , 35. Each graph of the graphs shown on the left side of FIG. 7 is associated with one deployment level DL0, DL1, DL2, DL3, DL4 and one application component 11, 12, 13. The graphs visualize deployment information derived from all constraint information determined by all tenants 31, 32, 33, 34, 35 for the corresponding deployment level DL0, DL1, DL2, DL3, DL4 and application component 11, 12, 13. For example, according to the deployment information shown in the top left corner of FIG. 7, the first application component 11 is shared on the initial deployment level DL0 between the first, second and fifth tenant 31, 32, 35 and between the second and third tenant 32, 33 and between the third and fourth tenant 33, 34. However, the first application component 11 is, for example, not shared on the initial deployment level DL0 between the first tenant 31 and the third or fourth tenant 33, 34 or between the second and fourth tenant 32, 34 and so on. It is furthermore illustrated in FIG. 7 that each application component 11, 12, 13 may be deployed on less than all deployment levels DL0, DL1, DL2, DL3.

The right side of FIG. 7 illustrates a valid deployment configuration for the various deployment levels DL0, DL1, DL2, DL3 and DL4. On the initial deployment level DL0, the initial deployment units U01, U02 are associated to the first application component 11, the initial deployment units U01', U02', U03' are associated to the second application component 12 and the initial deployment unit U01" is associated to the third application component 13, respectively. For example, the first and third tenant 31 and 33 do not share a deployment unit U01, U02 associated with the initial deployment level DL0 and the first application component 11. Thus, the first and third tenant 31, 33 are assigned to different deployment units U01, U02. Specifically, on the initial deployment level DL0 the first tenant 31 is assigned to a first initial deployment unit U01 associated with the first application component 11 and the third tenant is assigned to a second initial deployment unit U02 associated with the first application component 11. In an analogue way, all other deployment constraints are taken into account when the deployment configuration is determined.

Furthermore, each application component 11, 12, 13 is only deployed on the deployment level, which they actually apply to. This means, for example, that the third application component 13 is only deployed on the deployment levels DL0 and DL4. Therefore, here only deployment units U01" and U41 deploy the third application component 13, which are associated with deployment levels DL0 and DL4, respectively.

On the first further deployment level DL1, the first further deployment units U11, U12, U13, U14 are deployed, wherein the initial deployment units U01' and U02' associated with the second application component 12 and the initial deployment level DL0 share the first further deployment unit U13 on the first further deployment level DL1. For example, the initial deployment units U01' and U02' may be two instances of the same application component (deployment level DL0) that run on the same virtual machine (deployment level DL1).

Similarly, the second further deployment level DL2 comprises the second further deployment unit U21, which encapsulates the first further deployment units U11 and U12. The third further deployment level DL3 comprises the third further deployment unit U31, which encapsulates the first further deployment units U13 and U14. The fourth further deployment unit U41 encapsulates the second further deployment unit U21, the initial deployment unit U01' and the third further deployment unit U31.

Figure 8:
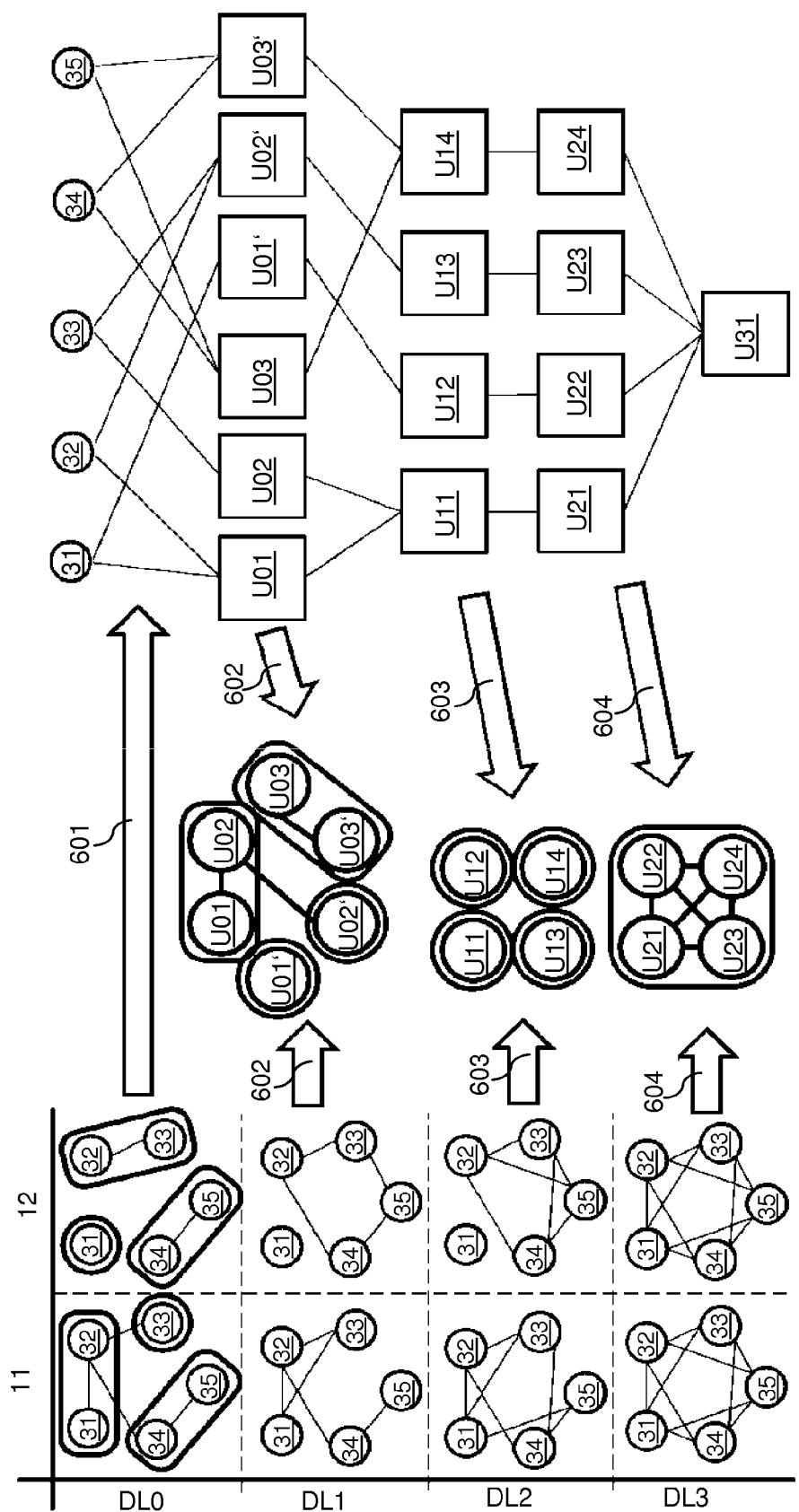
FIG. 8 schematically illustrates the optimization method.

FIG. 8 schematically illustrates the optimization method. Here, a valid and optimal deployment configuration is determined by means of the optimization method. In the first step (see reference numeral 601) of the optimization method at least one initial deployment unit of a plurality of initial deployment units U01, U02, U03, U01', U02', U03' is generated per application component 11, 12 of the plurality of application components 10. Here, the initial deployment units U01, U02 and U03 are associated with the first application component 11. And the initial deployment units U01', U02' and U03' are here associated with the second application component 12. Furthermore, the plurality of initial deployment units U01, U02, U03, U01', U02', U03' are associated with an initial deployment level DL0 of a sequence of deployment levels DL0, DL1, DL2, DL3. Preferably, the initial deployment units U01, U02, U03, U01', U02', U03' are created for each application component 11, 12 separately.

In a second step (see reference numeral 602) of the optimization method a plurality of further deployment units U11, U12, U13, U14 associated with a further deployment level DL1 is generated. Preferably, the second step of the optimization method comprises determining a minimum number of further deployment units U11, U12, U13, U14 for deploying the plurality of preceding deployment units U01, U02, U03, U01', U02', U03' on the further deployment level DL1 depending on the constraint information. The plurality of further deployment units U11, U12, U13, U14 are generated depending on the plurality of preceding deployment units U01, U02, U03, U01', U02', U03' associated with a preceding deployment level DL0 in the sequence of deployment levels DL0, DL1, DL2, DL3. In this case, the preceding deployment units U01, U02, U03, U01', U02', U03' are the initial deployment units U01, U02, U03, U01', U02', U03' of the initial deployment level DL0.

Here, the further deployment level is a first further deployment level DL1, which is the next deployment level in the sequence of deployment levels DL0, DL1, DL2, DL3 following the initial deployment level. Likewise, the further deployment level can be a second further deployment level DL2 or third further deployment level DL3 in subsequent second steps of the optimization method (see reference numerals 603 and 604). Preferably, the second step is sequentially carried out for each further deployment level DL1, DL2, DL3 of the sequence of deployment levels DL1, DL2, DL3. Preferably, the valid deployment configuration of the application 1 is optimized by minimizing the total number of deployment units U01, U02, U03, U01', U02', U03', U11, U12, U13, U14, U21, U22, U23, U24, U31 associated with all deployment levels of the sequence of deployment levels DL0, DL1, DL2, DL3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for deploying an application on a computing resource, wherein the application is provided remotely to a plurality of tenants of users, wherein the application comprises a plurality of application components, the computer-implemented method comprising:
   defining groups and sub-groups of tenants for categorizing the plurality of tenants, including defining a first group and a first plurality of sub-groups associated with the first group of tenants;
   assigning each tenant of the plurality of tenants to at least one group and/or at least one sub-group;
   providing a deployment model for each combination of:
      an application component of the plurality of application components and a tenant of the plurality of tenants;
   determining constraint information for each combination of application component and tenant depending on the deployment model, wherein the deployment model is configured to enable each tenant of the plurality of tenants to include and/or exclude entire groups and sub-groups of tenants from sharing one or more application components and/or infrastructure of the computing resource, wherein including or excluding the first group causes the first plurality of sub-groups associated with the first group of tenants to be included or excluded, respectively, wherein a hierarchical relationship between the plurality of application components corresponds to a directed graph without cycles, and wherein a further application component is associated with a higher level application component;
   determining a valid deployment configuration of the application on the computing resource depending on the constraint information associated with each application component of the plurality of application components; and
   deploying the application on the computing resource depending on the determined valid deployment configuration;
   wherein the valid deployment configuration is determined via an optimization method;
   wherein in a first step of the optimization method at least one initial deployment unit of a plurality of initial deployment units is generated per application component of the plurality of application components, the plurality of initial deployment units being associated with an initial deployment level of a sequence of deployment levels;
   wherein in a second step of the optimization method a plurality of further deployment units associated with a further deployment level is generated, the plurality of further deployment units being generated depending on a plurality of preceding deployment units associated with a preceding deployment level in the sequence of deployment levels;
   wherein the second step of the optimization method comprises determining a minimum number of further deployment units for deploying the plurality of preceding deployment units on the further deployment level depending on the constraint information.

2. The computer-implemented method according to claim 1, wherein determining constraint information for each combination of application component and tenant comprises:
   deriving the constraint information associated with the application component from further constraint information associated with the further application component of the plurality of application components; or
   receiving the constraint information from the tenant of the plurality of tenants which is associated to the application component.

3. The computer-implemented method according to claim 1, wherein the valid deployment configuration of the application is optimized by minimizing a total number of deployment units associated with all deployment levels.

4. The computer-implemented method according to claim 1, further comprising:
   enabling each tenant of the plurality of tenants to include and/or exclude a module of an individual application component of the plurality of application components, wherein the module is a cryptographic module for encryption and/or decryption of data associated with the individual application component.

5. The computer-implemented method according to claim 1, further comprising:
   enabling each tenant of the plurality of tenants to include and/or exclude the application component of the plurality of application components.

6. The computer-implemented method according to claim 1, wherein determining a valid deployment configuration includes generating a number of instances of each application component of the plurality of application components depending on the constraint information.

7. The computer-implemented method according to claim 6, wherein the computing resource includes a plurality of computing machines in a computing environment, and
   wherein deploying the application on the computing resource includes running at least one instance of the number of instances of each application component of the plurality of application components on at least one computing machine of the plurality of computing machines.

8. The computer-implemented method according to claim 7, wherein determining a valid deployment configuration includes assigning each instance of the number of instances of the at least one application component to exactly one computing machine of the plurality of computing machines depending on the constraint information.

9. The computer-implemented method according to claim 7, wherein determining a valid deployment configuration includes assigning each tenant to exactly one instance of the number of instances depending on the constraint information.

10. The computer-implemented method according to claim 1, wherein providing a deployment model for each combination of tenant and application component includes:
   providing the tenant with a set of deployment models;
   enabling the tenant to assign exactly one deployment model of the set of deployment models to each application component of the plurality of application components; and
   enabling the tenant, for each application component of the plurality of application components, to determine constraint information for the assigned deployment model.

11. The computer-implemented method according to claim 10, wherein enabling the tenant to assign exactly one deployment model to each application component of the plurality of application components includes assigning one of a private deployment model, a public deployment model, a white deployment model, a black deployment model and/or a gray deployment model;
  wherein the private deployment model is configured to disable the sharing of the application component with all other tenants;
  wherein the public deployment model is configured to enable the sharing of the application component with all other tenants;
  wherein the white deployment model is configured to enable the sharing of the application component with all other tenants of a whitelist specified by the tenant;
  wherein the black deployment model is configured to disable the sharing of the application component with all other tenants of a blacklist specified by the tenant;
  wherein the gray deployment model is configured to enable or disable the sharing of the application component with another tenant as specified by the tenant.

12. The computer-implemented method according to claim 1, wherein determining the valid deployment configuration includes, for each tenant of the plurality of tenants, specifying a required resource for each application component of the plurality of application components, wherein the required resource includes size of memory and/or number of processors.

13. The computer-implemented method according to claim 1, wherein determining the valid deployment configuration includes specifying available computing resource for running the application, wherein the available computing resource includes size of memory and/or number of processors.

14. The computer-implemented method according to claim 1, wherein determining the valid deployment configuration includes, for each tenant of the plurality of tenants, specifying a required resource for each application component of the plurality of application components;
  wherein determining the valid deployment configuration includes specifying available computing resource for running the application; and
  wherein the valid deployment configuration is determined depending on the required resource and depending on the available resource by minimizing the required resource depending on the constraint information.

15. A system for deploying an application on a computing resource, wherein the application is provided remotely to a plurality of tenants of users, wherein the application comprises a plurality of application components, the system comprising:
  at least one programmable processor integrated with the computing resource; and
  a machine-readable medium integrated with the computing resource storing instructions that, when executed by at least one programmable processor cause the at least one programmable processor to facilitate performance of the following:
  defining groups and sub-groups of tenants for categorizing the plurality of tenants, including defining a first group and a first plurality of sub-groups associated with the first group of tenants;
  assigning each tenant of the plurality of tenants to at least one group of tenants of the sets of groups of tenants;
  assigning each tenant of the plurality of tenants to at least one group and/or at least one sub-group;
  providing a deployment model for each combination of: an application component of the plurality of application components and a tenant of the plurality of tenants;
  determining constraint information for each combination of application component and tenant depending on the deployment model, wherein the deployment model is configured to enable each tenant of the plurality of tenants to include and/or exclude entire groups and sub-groups of tenants from sharing one or more application components and/or infrastructure of the computing resource, wherein including or excluding the first group causes the first plurality of sub-groups associated with the first group of tenants to be included or excluded, respectively, wherein a hierarchical relationship between the plurality of application components corresponds to a directed graph without cycles, wherein a further application component is associated with a higher level application component;
  determining a valid deployment configuration of the application on the computing resource depending on the constraint information associated with each application component of the plurality of application components; and
  deploying the application on the computing resource depending on the determined valid deployment configuration;
  wherein the valid deployment configuration is determined via an optimization method;
  wherein in a first step of the optimization method at least one initial deployment unit of a plurality of initial deployment units is generated per application component of the plurality of application components, the plurality of initial deployment units being associated with an initial deployment level of a sequence of deployment levels;
  wherein in a second step of the optimization method a plurality of further deployment units associated with a further deployment level is generated, the plurality of further deployment units being generated depending on a plurality of preceding deployment units associated with a preceding deployment level in the sequence of deployment levels;
  wherein the second step of the optimization method comprises determining a minimum number of further deployment units for deploying the plurality of preceding deployment units on the further deployment level depending on the constraint information.

16. A non-transitory processor-readable medium having processor-executable instructions stored thereon for deploying an application on a computing resource, wherein the application is provided remotely to a plurality of tenants of users, wherein the application comprises a plurality of application components, the processor-executable instructions, when executed by at least one processor, being configured to facilitate performance of the following:
  defining groups and sub-groups of tenants for categorizing the plurality of tenants, including defining a first group and a first plurality of sub-groups associated with the first group of tenants;
  assigning each tenant of the plurality of tenants to at least one group and/or at least one sub-group;
  providing a deployment model for each combination of: an application component of the plurality of application components and a tenant of the plurality of tenants;
  determining constraint information for each combination of application component and tenant depending on the deployment model, wherein the deployment model is configured to enable each tenant of the plurality of tenants to include and/or exclude entire groups and sub-groups of tenants from sharing one or more application components and/or infrastructure of the computing resource, wherein including or excluding the first group causes the first plurality of sub-groups associated with the first group of tenants to be included or excluded, respectively, wherein a hierarchical relationship between the plurality of application components corresponds to a directed graph without cycles, wherein a further application component is associated with a higher level application component;

determining a valid deployment configuration of the application on the computing resource depending on the constraint information associated with each application component of the plurality of application components; and deploying the application on the computing resource depending on the determined valid deployment configuration;

wherein the valid deployment configuration is determined via an optimization method;

wherein in a first step of the optimization method at least one initial deployment unit of a plurality of initial deployment units is generated per application component of the plurality of application components, the plurality of initial deployment units being associated with an initial deployment level of a sequence of deployment levels;

wherein in a second step of the optimization method a plurality of further deployment units associated with a further deployment level is generated, the plurality of further deployment units being generated depending on a plurality of preceding deployment units associated with a preceding deployment level in the sequence of deployment levels;

wherein the second step of the optimization method comprises determining a minimum number of further deployment units for deploying the plurality of preceding deployment units on the further deployment level depending on the constraint information.

\* \* \* \* \*